(12) United States Patent
Marangoni et al.

(10) Patent No.: US 7,357,957 B2
(45) Date of Patent: Apr. 15, 2008

(54) SPREADABLE FOOD PRODUCT

(75) Inventors: Alejandro G Marangoni, Ontario (CA); Stefan H. J. Idziak, Ontario (CA)

(73) Assignee: Fractec Research & Development Inc., Guelph, Ontario (CA)

( * ) Notice: Subject to any disclaimer, the term of this patent is extended or adjusted under 35 U.S.C. 154(b) by 699 days.

(21) Appl. No.: 10/840,276

(22) Filed: May 7, 2004

(65) Prior Publication Data

US 2005/0249855 A1 Nov. 10, 2005

(51) Int. Cl.
*A23D 9/013* (2006.01)

(52) U.S. Cl. .................. 426/602; 426/654; 516/20

(58) Field of Classification Search ............. None
See application file for complete search history.

(56) References Cited

U.S. PATENT DOCUMENTS

| | | | | |
|---|---|---|---|---|
| 3,914,458 A | * | 10/1975 | Terada et al. | 426/604 |
| 3,966,632 A | * | 6/1976 | Colliopoulos et al. | 516/29 |
| 4,446,165 A | * | 5/1984 | Roberts | 426/602 |
| 4,454,113 A | * | 6/1984 | Hemker | 424/63 |
| 4,825,002 A | * | 4/1989 | Davis | 564/438 |
| 5,472,728 A | * | 12/1995 | Miller et al. | 426/601 |
| 5,633,226 A | * | 5/1997 | Owen et al. | 514/2 |
| 5,646,109 A | * | 7/1997 | Owen et al. | 514/2 |
| 5,688,761 A | * | 11/1997 | Owen et al. | 514/2 |
| 5,948,825 A | * | 9/1999 | Takahashi et al. | 424/85.2 |
| 6,156,369 A | | 12/2000 | Eger et al. | |
| 6,368,653 B1 | | 4/2002 | Heertje et al. | |
| 6,569,478 B1 | | 5/2003 | Leser et al. | |
| 6,902,756 B2 | * | 6/2005 | Vlad | 426/602 |
| 2002/0001662 A1 | | 1/2002 | Sahasranamam | |
| 2002/0012739 A1 | * | 1/2002 | Cornelissen et al. | 426/606 |
| 2002/0065328 A1 | * | 5/2002 | Dederen et al. | 516/9 |
| 2004/0002438 A1 | * | 1/2004 | Hawkins et al. | 510/417 |
| 2004/0086622 A1 | * | 5/2004 | Pelan et al. | 426/602 |

FOREIGN PATENT DOCUMENTS

CA 2096429 4/1999
WO WO 95/35035 * 12/1995

* cited by examiner

*Primary Examiner*—Carolyn Paden
(74) *Attorney, Agent, or Firm*—Ursula McGuinness

(57) ABSTRACT

The present invention provides a novel cellular solid structure which can be used to structure an oil-water mixture into a semi-solid state. The invention is particularly useful in the manufacture of food products, drug delivery agents, coatings, barrier films and encapsulating media.

11 Claims, 4 Drawing Sheets

SPREADABLE FOOD PRODUCT

FIELD OF INVENTION

The present invention relates to products for a healthy lifestyle. In particular, it relates to an oil-based food product that has reduced trans fats and preferably low or virtually no animal fats or tropical oils.

BACKGROUND OF THE INVENTION

Triacylglycerols (TAGs) are the main constituent of edible fats and oils. TAGs are composed of three fatty acids esterified onto a glycerol backbone. Fatty acids are usually linear molecules composed of long aliphatic carbon chains that can range from four to twenty-two carbons in length. Fatty acids can be saturated or unsaturated. When a fatty acid is saturated, it means each carbon atom is attached to another carbon atom via a single covalent bond. Fats and oils containing predominantly saturated fatty acid will be solid at room temperature. Examples of saturated fats include animal fat such as milk fat or lard and tropical oils such as palm oil, palm kernel oil and coconut oil. A fatty acid is unsaturated when carbon-carbon double bonds are present within the chain of carbon atoms. A carbon-carbon double bond can adopt one of two conformations, namely cis and trans. Fats and oils containing unsaturated fatty acids with cis double bonds are usually liquid at room temperature. Examples of unsaturated fats include vegetable oils such as soybean, canola and cottonseed oils. Fats and oils containing unsaturated fatty acids with trans double bonds, on the other hand, are solid at room temperature. The difference between a fat and an oil is subtle. Generally, if the melting point of the TAGs is higher than about 30° C., the material is solid at room temperature, and is therefore referred to as a 'fat'. On the other hand, if the melting point of the TAGs is lower than about 15° C., the material will appear liquid at room temperature, and will thus be referred to as an 'oil'. Natural fats and oils are complex mixtures of TAGs with extremely varied chemical compositions.

Unsaturated fatty acids are generally in the cis conformation. However, when an oil is partially hydrogenated, various amounts of the cis form are converted to a more stable trans configuration, and are thus called trans fatty acids. Hydrogenation is a process by which a hydrogen molecule is added to an unsaturated double bond. Hydrogenation is a way of making vegetable oils harden at room temperature. Small particles of nickel or copper catalyst are added and the mix is heated to high temperatures under pressure and agitation for up to eight hours while hydrogen gas is injected. From the time the British patent on liquid phase hydrogenation was issued to Norman in 1903, and its introduction in the U.S. in 1911, few chemical processes have made as great an economic impact on any industry. Hydrogenation opened new markets for vegetable oil based on specialty products. Three reactions take place during hydrogenation—the saturation of carbon-carbon double bonds, the conversion of cis geometric isomers into more stable trans isomers, as well as the creation of new positional isomers, where double bonds are shifted to new positions along the fatty acid chain. Both the saturation of double bonds as well as the cis to trans isomerization of double bonds will result in an increase in the melting point of a fat. Thus, cooling of this hydrogenated fat below the melting point of the newly created triacylglycerol species containing saturated and trans fatty acids, will lead to the partial crystallization of the material. This semisolid fat matrix will therefore be structured as a network of fat crystal aggregates with liquid oil trapped within. The solid-like characteristics of this material are due to this underlying fat crystal network. Without this network of crystallized fat, the material would be an oil.

Manufacturers use the hydrogenation process to convert vegetable oil into a solid form for the manufacture of margarine, shortening and spreads. The process is also used to increase the shelf life and flavor stability of food products containing vegetable oils. During hydrogenation, anywhere from eight to seventy percent of the fatty acid content will be converted to trans fatty acids. The amount of conversion depends on the process and the desired product.

Trans fatty acids also occur naturally. When unsaturated fatty acids are ingested by ruminants (i.e., cows) the fatty acids can be partially hydrogenated by bacteria in the rumen of the animal (stomach) and thus trans fatty acids can be found in milk fat, dairy products, beef and mutton fat. Trans fatty acids usually make up about two to nine percent of the fat in these products. Ruminant animals are not the only animals in which this process occurs. Chicken and pigs often ingest trans fatty acids through the feed they are given and the trans fatty acids make their way into pork and poultry products.

Over the past 50 years hydrogenated oils have become a prevalent part of the diet in developed countries. Margarine is an example of a product that contains hydrogenated oils and it is one of the most common sources of hydrogenated oil in our diets. These hydrogenated oils have become so commonplace in prepared foods that it is a major feat to avoid them. Margarine is sometimes marketed as a healthy alternative to saturated fats like butter and lard. However while these products start out as unsaturated oils, the final product includes trans fatty acids that are increasingly under attack as major contributors to cardiovascular disease.

New research into the role fats and oils play in human health has indicated that consumption of trans fatty acids is associated with increased incidences of cancer, heart disease, elevated cholesterol levels and a host of other health problems. Over ten years of clinical and epidemiological research suggest that there is a positive linear relationship between trans fatty acid intake and a decrease in serum HDL ('good' cholesterol) combined with an increase in serum LDL ('bad' cholesterol). These combined effects increase the risk of coronary heart disease. Both the Institute of Medicine and the American Heart Association recommend a reduction in the intake of trans fatty acids, and to preferably eliminate them altogether from the diet. This is difficult to achieve without proper labeling of foods. Prompted originally by the Center for Science in the Public Interest back in 1994, the U.S. Food and Drug Administration (FDA) has decreed that, as of January of 2006, food manufacturers must include the trans fatty acid content in product labels.

Long before the health risks associated with trans fatty acids were realized, it was known that consumption of animal fats and tropical oils had a negative effect on cardiovascular health. The American Heart Association (AHA) discourages the consumption of animal fats such as butter (milk fat), lard (pig fat), tallow (beef fat) due to their relatively high content of cholesterol and saturated fatty acids, which makes them highly atherogenic—they contribute to the build up of cholesterol and other substances in artery walls. The AHA also discourages the consumption of trans fats. Moreover, the AHA also discourages the consumption of tropical oils such as palm oil, palm kernel oil and coconut oil due to their high saturated fatty acid content.

The need for a healthy alternative to trans fatty acids and saturated fats creates technological hurdles for the food manufacturing industry. It is difficult to eliminate trans fats from a food formulation where the goal is to transform an oil, which is liquid at room temperature to a fat, which is 'solid' at room temperature to enhance texture and appearance of a food product.

There have been various attempts in the food industry to provide an edible oil product that is solid at room temperature and that contains little or no trans fatty acids or saturated fats. For example, U.S. Pat. No. 6,569,478 discloses a food composition comprising at least one food ingredient in a monoglyceride mix in an amount sufficient to form a mesomorphic structure which substantially encapsulates the food ingredient and water.

U.S. Pat. No. 6,156,369 discloses a food spread comprising a non-aqueous mixture of an edible oil and a monoglyceride in an amount of from about 85% to about 98% edible oil and from about 2% to about 15% monoglyceride.

Canadian Patent No. 2,096,429 discloses a finished foodstuff comprising bulk regions of a mesomorphic phase of edible surfactant and less than 80 wt % edible oil, and wherein the mesomorphic phase is a continuous phase and/or contains 80 wt % or more of water as well as methods of making and using the foodstuff.

Much of the effort to create low-trans and saturate fat alternatives has focused on the use of monoglyceride gels. The early work on monoglyceride gels focused on aqueous lyotropic systems only. When heated above their 'Kraft' temperature, monoglycerides and other amphiphillic molecules, can form lamellar phases structured as alternating layers of monoglyceride bilayers and water. Upon cooling, monoglycerides will crystallize into kinetically favored, but thermodynamically metastable forms, yielding an alpha-gel. This alpha-gel is structured in a similar fashion as the lamellar phase—water layers sandwiched between monoglyceride bilayers. Upon ageing, alpha-gels tend to rearrange into beta-gels, or coagels, upon transformation of monoglyceride crystals into more thermodynamically stable crystal forms. In these coagels, however, water layers are squeezed out of the gel structure, leaving behind stacked monoglyceride bilayers.

These mesophases (alpha-gels and coagels) were the subject of a flurry of research activity and several patents by Unilever R&D. In all of this work, aqueous mesophase gels—usually of water contents greater than 80%—were mixed with a variety of materials for structuring purposes. Under vigorous mixing (high shear), aqueous mesophase gel material was dispersed within other phases until some kind of stabilization was achieved. This method of making monoglyceride gels limited this technology to the manufacture of low-fat edible spreads. Monoglycerides can also be used to structure pure oil, but in that case, monoglycerides are used as a conventional hardstock, and not as a mesophase gel.

Using standard techniques of blending, interesterification (chemical and enzymatic) and fractionation, it is virtually impossible to produce a spread having the texture of a tub-type margarine without incorporating saturated fats and/ or trans fatty acids. Thus, there has long been an unmet need for alternative technologies to provide a product that has the consumer desired features of texture and spreadability without harmful trans fats or animal fats.

SUMMARY OF THE INVENTION

The present invention provides a new strategy for the manufacture of a product having the properties of a plastic fat without the addition of traditional saturated and trans fat hardstocks (blending), sometimes followed by chemical or enzymatic interesterification. This strategy does not include fractionation either.

present invention provides novel food products that are oil-based and have a fat-like (i.e. solid) consistency yet contain very low levels of trans and saturated fatty acids.

In a preferred embodiment, a spread that is trans fatty acid free is provided.

In one aspect, the present invention provides a process for preparing an edible oil product that can be used as a fat replacement.

The process comprises the steps of:
a. preparing a stock solution of surfactant in oil;
b. heating the stock solution;
c. adding water to form an oil/surfactant/water composition;
d. mixing the composition; and
e. allowing the resultant composition to set.

In a preferred embodiment of the process, the stock solution comprises a non-ionic surfactant and an ionic surfactant in an oil.

In another preferred embodiment, the stock solution is heated to above its melting point at step b).

In yet another embodiment, the water may or may not be buffered. Preferably alkaline deionized or distilled water is used to form the oil/surfactant/water composition.

In a further preferred embodiment, the composition is mixed while cooling until a paste is obtained and the composition is then allowed to set at room temperature.

In a preferred embodiment the stock solution comprises about 5 to 15% of the surfactants and has a melting point of about 50 to 90° C.

In another aspect of the invention, an edible food product is provided. The food product incorporates a cellular solid matrix formed by the interaction of an oil phase and a water phase. The oil phase comprises a non-ionic surfactant, an ionic surfactant and an oil.

The non-ionic surfactant is preferably selected from the group consisting of monoglycerides, diglycerides, polyglycerol esters, non-ionic phospholipids and mixtures thereof. The food product comprises at least 3% of the non-ionic surfactant, preferably about 4 to 7%.

Preferred ionic surfactants are selected from the group consisting of cationic phospholipids, cationic non-fatty carboxylic acid esters, anionic lactylated fatty acid salts, anionic phospholipids, anionic non-fatty carboxylic esters, fatty acids and their metal salts. More preferred ionic surfactants are sodium stearyl lactylate (SSL), phosphatidic acid, and diacyl tartaric acid ester of monoglyceride (DATEM).

The ratio of the non-ionic surfactant to ionic surfactant is preferably in the range of 10:1 to 30:1, most preferably about 20:1.

Virtually any edible oil can be used in the preparation of the food product. Preferred oils for use in the invention are vegetable oils such as soybean oil, sunflower oil, canola oil, corn oil, peanut oil, olive oil, rice bran oil, safflower oil and flaxseed oil. Vegetable oils that are low in saturated fatty acids are preferred. Other oils, such as fish oil, may be used to provide the beneficial effects of omega fatty acids: Oils derived from animal fats by fractionation may also be used.

The oil is present in the food product in an amount of about 30% to about 70% preferably 40% to 60%, most preferably about 50%.

The food product comprises from about 30% to about 70% water, more preferably about 40% to 60%, most preferably about 50% water.

In one preferred embodiment, the food product comprises about 4 to 7% monoglyceride, about 0.2 to 0.35% anionic surfactant, with the balance of the mass comprised of about 40 to 60% oil and about 40 to 60% water.

in a preferred embodiment, the product has the properties of a plastic fat or spread, such as margarine and shortening, in terms of texture and spreadability. The components of the process can be adjusted to provide different consistencies such as a whipped topping or a mayonnaise.

In a preferred embodiment, the food product is selected from a margarine-like spread, flavored spreads including low fat spreads; dressings, dips, beverages and mayonnaise type products. Dairy products, incorporating the cellular solid matrix such as ice cream and ice milk, whipped toppings, yoghurt, soft cheeses, milk and cream substitutes are also included within the scope of the invention.

BRIEF DESCRIPTION OF THE DRAWINGS

Further objects, features and advantages of the invention will be readily apparent from the detailed description that follows and reference to the accompanying drawings, wherein.

DETAILED DESCRIPTION

Figure 1:
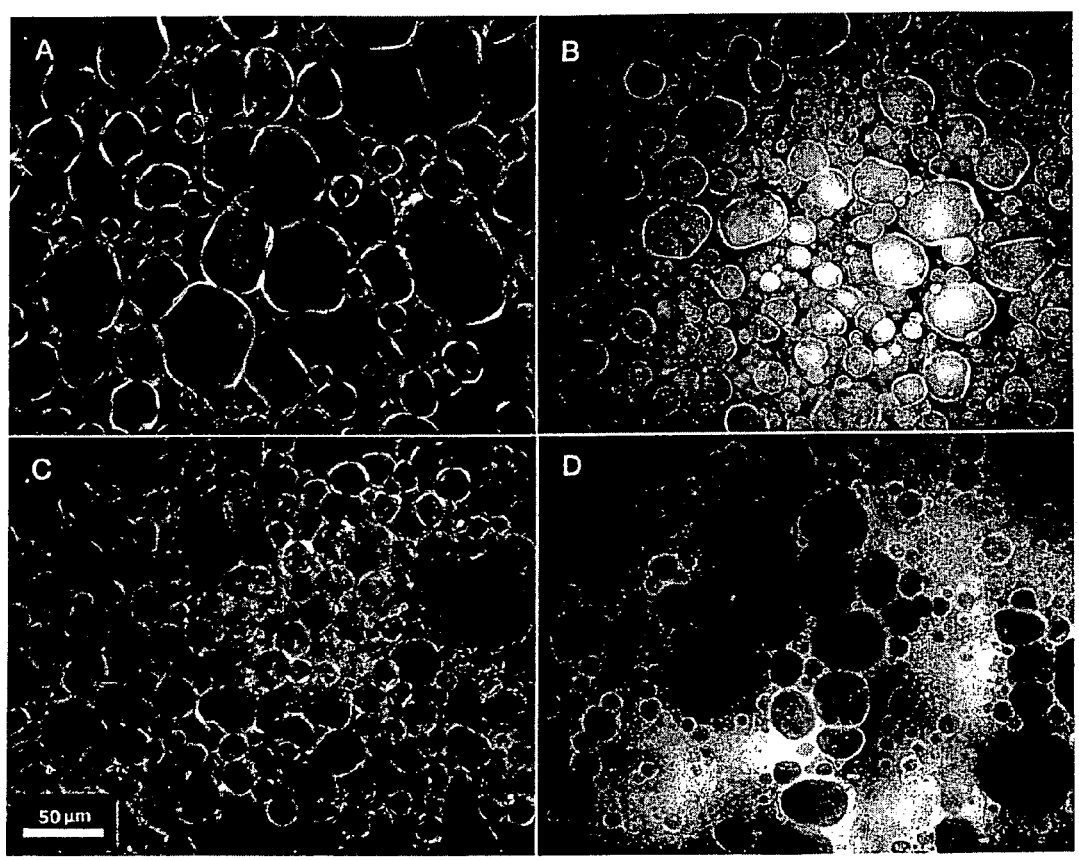
FIGS. 1A to 1D are micrographs of the cellular solid of the present invention illustrates a composition of the present invention.

The present invention provides a novel, cellular solid matrix for the structuring of edible oil food products. The food product is typically a spread that has the qualities of temperature cycling stability, spreadability and texture required by consumers. The cellular solid matrix of the present invention can also be used to structure other oil-based products such as coatings, barrier films, or capsules for pharmaceutical ingredients.

The cellular solid matrix is formed by first preparing a surfactant in oil stock solution. Various types of oils can be used. This includes various types of vegetable oil, fish oil and animal oils. Examples of vegetable oils include peanut oil, palm oil, flaxseed oil, olive oil safflower oil, sunflower oil rice bran oil and all other types of vegetable oils. To reap the most health benefits, it is preferable to use a vegetable that does not contain saturated fatty acids. In certain circumstances, however, it may be desirable to use a tropical oil, which does include some saturated fatty acids. It may also be desirable to use a fish oil to incorporate the healthy omega fatty acids that are contained therein. The stock solution typically contains about 3 to 30%, preferably about 5 to 15% w/w surfactant. The surfactant component may contain both non-ionic and ionic surfactants. For example, the surfactant component may comprise a 10:1 to 30:1 ratio of non-ionic to ionic surfactant, preferably about 20:1.

Various types of non-ionic surfactants known to those skilled in the art can be used in the present invention. Monoglycerides, diglycerides, poly-glycerol esters, non-ionic phospholipids and mixtures thereof are some examples of useful surfactants. Some examples of ionic surfactants that are useful in the present invention include cationic phospholipids, cationic non-fatty carboxylic acid esters, anionic lactylated fatty acid salts, anionic phospholipids, anionic non-fatty carboxylic esters, fatty acids and their metal salts. Specific ionic surfactants are sodium stearoyl lactylate (SSL), phosphatidic acid, and diacyl tartaric acid ester of monoglyceride (DATEM). It is clearly apparent to one skilled in the art that other ionic surfactants not specifically mentioned herein could also be used.

The stock solution is heated to a temperature where the surfactant melts in the oil. For example, monoacylglycerol can be added to a vegetable oil and heated until it melts. The temperature that the stock solution is heated to depends on the melting point of the solution. It is usually in the range of about 50 to 90° C. For example, for a 10% monoacylglycerol in vegetable oil stock solution, heating to about 85° C. is very effective. Water is then added. The water can be from a variety of sources. It may be deionized and/or distilled and it may be buffered or not. Alkaline, deionized water is often used, but it is not a requirement that the water be treated in this manner. The amount of water added can vary, but best results are obtained when the combined composition comprises about 30 to 70% of the oily stock solution and conversely 70% to 30% of water. Especially good results are obtained when the water and oily stock solution are present in approximately equal portions of each. For example, the combined composition could contain 40% oily stock solution and 60% water, 50% stock solution and 50% water or 60% stock solution and 40% water. The combined composition is mixed thoroughly. As the solution cools, under gentle mixing, the cellular solid structure is formed. During the process, the surfactant, such as monoacylglycerol, crystallizes to form cell walls. The cells of the product entrap water and/or oil within their walls.

The present invention provides the first example of a cellular solid being formed by first melting a surfactant in oil and then adding water. There is no need to add any hardstock to structure the product and there is no conversion of cis fatty acids into trans fatty acids. Thus, a novel, heart healthy product can be achieved which has the characteristics of taste and texture desired by consumers without the harmful components. The products of the present invention can be low calorie spreads or other food types as discussed below.

The surfactant concentration of the stock solution can vary, but the amount of non-ionic surfactant in the final product is preferably in the range of about 4 to 7%. For example, a 10% stock solution can be prepared which contains 10 grams of a solid surfactant such as monoacylglyceride, 0.5 grams of an ionic surfactant such as sodium stearoyl lactylate (SSL) and 89.5 grams of oil. If 60 mls of this stock solution is heated to the melting temperature of about 85° C. and then, as it cools, 40 mls of water is added, the final product will contain 6% of the monoglyceride. If a 20% stock solution were used then 40 mls of the stock solution would be mixed with 60 mls of water to achieve the same final monoglyceride concentration. A 10% stock solution has been found to be economical and easy to use. Aiming for a final monoacylglyceride concentration of about 4 to about 7% has been found to be useful for the structuring of a spreadable food product. A final monoglyceride concentration of 4 to 8% results in a spread having all the desirable features of texture, meltability and stability usually associated with margarine. The present invention provides the first description of a spread made entirely from vegetable oil, containing no trans fats, and no saturated animal fats or tropical oils.

While it is preferable to use a vegetable oil which has a low level of saturated fatty acids, it may under certain circumstances, be desirable to use another type of oil. For example, fish oil could be used to provide heart healthy omega fatty acids. Tropical oils may be used in certain circumstances to promote certain flavors. In all cases, the cellular solid structure of the present invention eliminates the need for hydrogenation of the oil with the concurrent conversion to trans fatty acids.

In the process and product of the present invention, a cellular solid matrix is formed of crystallized surfactant. Water and oil are trapped in the cells of the matrix as they are formed.

The process and product of the present invention differ significantly from that described by Heertje et al. in U.S. Pat. No. 6,368,653. Heertje et al combine a surfactant such as a monoglyceride with water to form a gel that they refer to as a "mesomorphic phase". Oil is then added and the mixture is vigorously agitated to break up the gel so that the oil is interspersed by bulk regions of mesomorphic phases that serve to structure the food product much in the same way as a hardstock would. The microstructure of fats produced using the Heertje et al. procedure is not that of a cellular solid matrix, but a collection of plate-like crystals.

The cellular solid structure of the present invention can be seen by referring to FIG. 1. FIG. 1 shows polarized light micrographs of a cellular solid matrix created by adding (A) 50% (v/v) water and (C) 40% (v/v) water to a 10% monoglyceride-in-oil stock solution. The micrographs demonstrate that cell size increases as the water content increases to 50% versus 40% (FIG. 1A vs. 1C). Gels did not form below 27% (v/v) water. The microstructure of monoglyceride gels was characteristic of that of cellular solids, resembling a foam.

The 50% water structures were stained for either oil or water content. When stained with the oil-soluble dye Nile Red (FIG. 1B), all cells were stained. This is to be expected since the dye can partition to the cell walls as well as to the interior of the cells that contain oil.

Unlike Nile Red, the water-soluble dye, rhodamine, partitions only to areas that contain water. In the micrograph shown in FIG. 1D, some of the cells are stained with rhodamine, while others are not. This suggests that some cells contain water while others contain only oil and/or air.

This demonstrates that monoglycerides dissolved in oil can self-assemble, crystallize and form a cellular-solid like network in the absence of high shear treatments.

Figure 2:
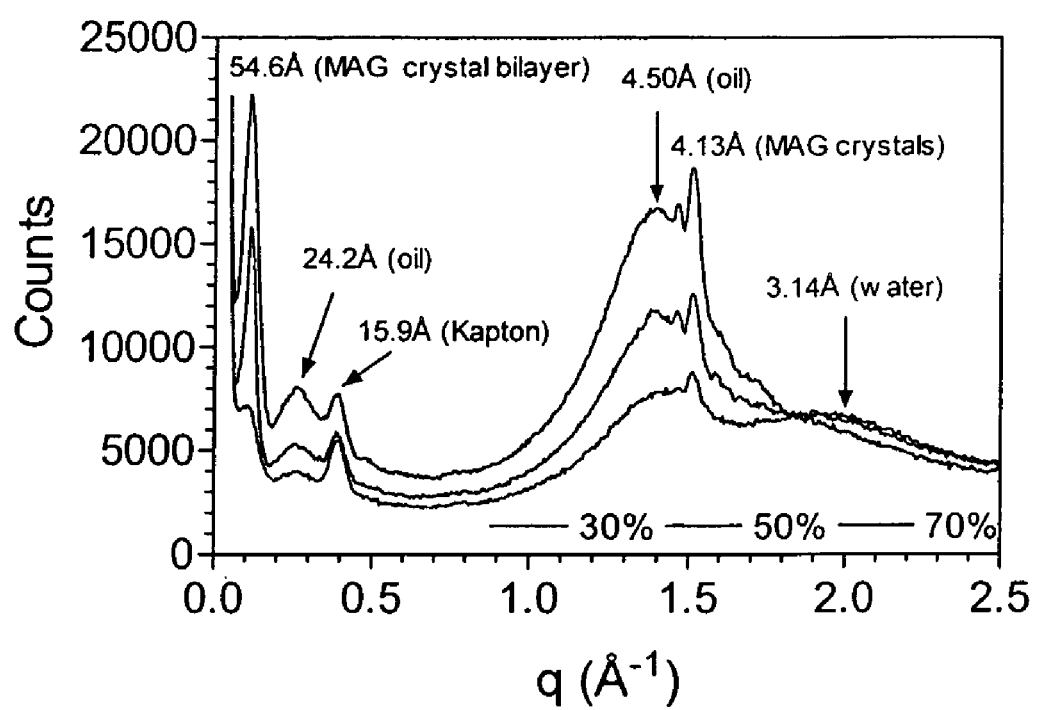
FIG. 2 illustrates a powder X-ray diffraction pattern of a structured composition of the present invention.
Figure 3:
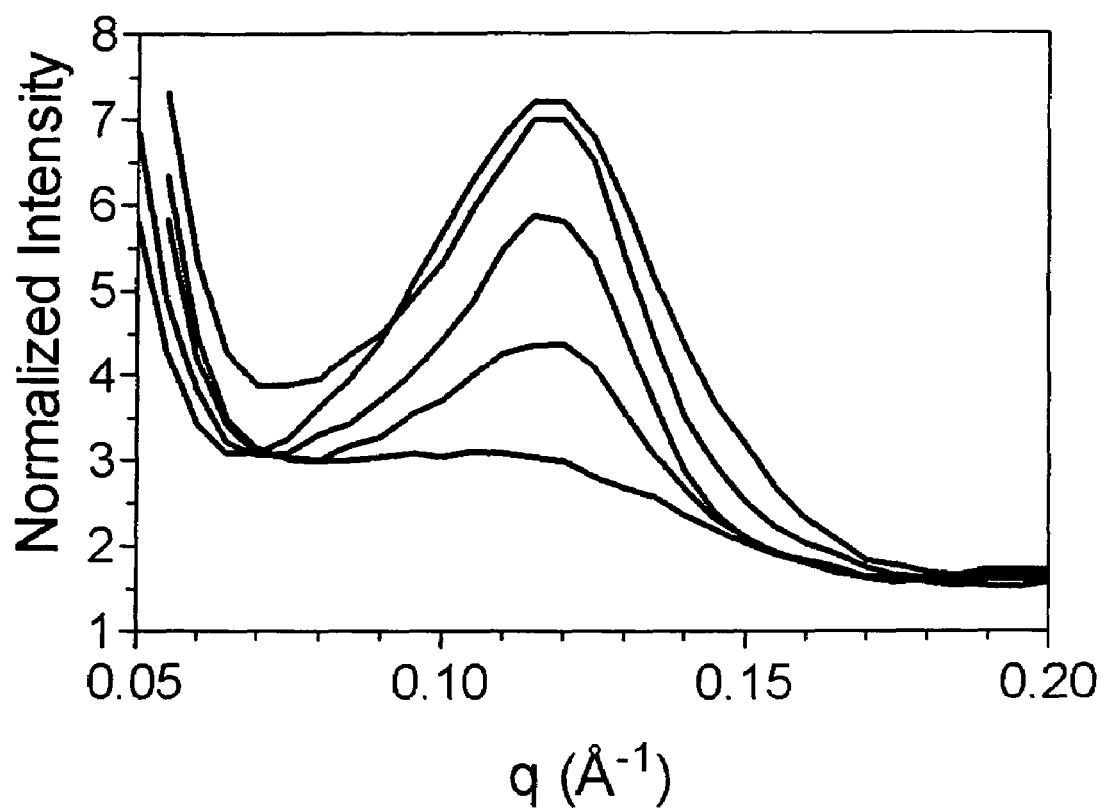
FIG. 3 is an enlarged normalized X-ray diffraction pattern of structures containing different amounts of water.

The structure of the cellular solid was confirmed by powder X-ray diffraction and the results are shown in FIG. 2. The reflection at 54.6 Angstroms corresponds to the size of the crystalline monoglyceride bilayers (the long axis of the unit cell, or the 001 plane). The reflection at 4.13 Angstroms corresponds to the monoglyceride crystals. FIG. 3 illustrates an enlarged, normalized graph of this region. As more water is added (top to bottom: 27%, 40%, 50%, 60%, 70% water) it can be seen that the peak which corresponds to the size of the spacing in the structure does not increase. This indicates that the structure is stable and an increase in the proportion of water and/or oil does not cause swelling of the cellular walls. In other words, water and/or oil is held within the cellular structure, not trapped between lamellar layers.

Figure 4:
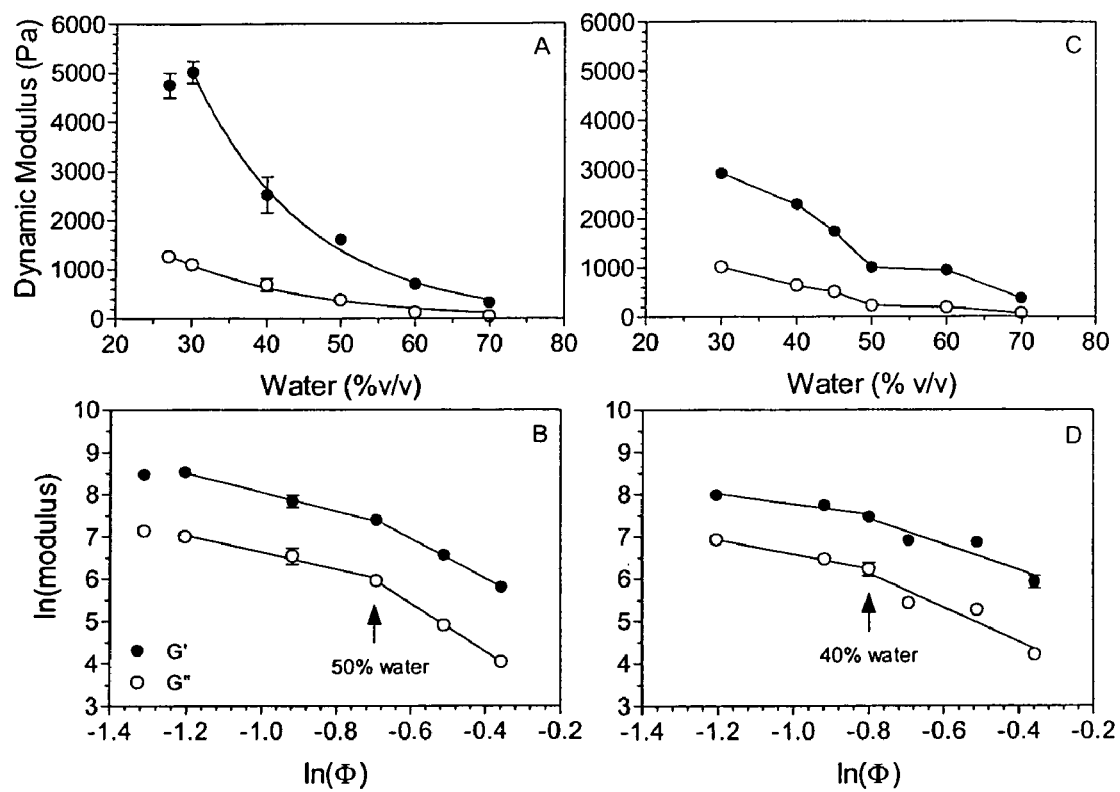
FIG. 4 demonstrates graphically the decreases in the storage and loss dynamic shear elastic moduli as a function of increasing water content.

Dynamic Theological studies on the different monolgyceride gels manufactured vigorous mixing (FIGS. 4A and 4B) and under gentle mixing (FIGS. 4C and 4D) showed a decrease in the elastic moduli of the gels as a function of increasing water concentration (FIGS. 4A and 4C). This is consistent with a predicted decrease in the Young's modulus (E) of a cellular solid with decreases in the volume fraction ($\phi$) of cell wall material ($E \sim \phi^m$). However, a break was also detected at ~50% (v/v) water in log-log plots of the elastic modulus versus the volume fraction of water (FIGS. 4B and 4D). This appears to correspond to an abrupt increase in cell size at and above ~50% water. For cellular solids, an increase in cell size is predicted to lead to a decrease in the elastic modulus. The results are consistent with this prediction, providing further evidence that oil-water mixtures can be structured using monoglyceride-based cellular solids. The mixing procedure did not affect the Theological properties of the material when as little as 40% water was used. It did, however, have a profound effect at high oil/low water contents (30% water). The microstructure of the product is not greatly affected by the level of mixing. Excessive mixing during cooling, however, did lead to structural breakdown of the material and exudation (syneresis) of the oil and water. This was likely due to the rupture of the cellular matrix entrapping the oil. Sufficient mixing is required for the proper homogenization of the phases, but once the material starts setting and the cellular matrix forms, it is desirable to keep mechanical input (mixing, shearing, working) to a minimum, or avoid it altogether.

The abrupt change in rheological behavior and microstructure below ~50% (v/v) water is interesting since samples containing 27-50% (v/v) water were also those with ideal quality characteristics, including flavor, spreadability and consistency.

This novel oil structuring process opens up possibilities for the commercial manufacture of heart-healthy margarines and spreads without the use of tropical oils, hydrogenated fats or animal fats.

It is clearly apparent that while the description has focused on the development of novel food products, a cellular solid matrix can also be used to structure other oil based products to be used as barriers, coatings, host/embedding/encapsulating media for a diverse range of compounds such as pharmaceuticals and other bioactive compounds such as proteins, membrane proteins, hydrophilic and hydrophobic peptides, as well as diverse preservatives.

The above disclosure generally describes the present invention. It is believed that one of ordinary skill in the art can, using the preceding description, make and use the compositions and practice the methods of the present invention. A more complete understanding can be obtained by reference to the following specific examples. These examples are described solely to illustrate preferred embodiments of the present invention and are not intended to limit the scope of the invention. Changes in form and substitution of equivalents are contemplated as circumstances may suggest or render expedient. Other generic configurations will be apparent to one skilled in the art. All journal articles and other documents such as patents or patent applications referred to herein are hereby incorporated by reference.

EXAMPLES

Although specific terms have been used in these examples, such terms are intended in a descriptive sense and not for purposes of limitation. Methods referred to but not explicitly described in the disclosure and these examples are reported in the scientific literature and are well known to those skilled in the art.

Example 1

Sample Preparation

Distilled monoacylgycerols (MAG's) and anionic surfactant were provided by Danisco (Kansas, Mo.). They included Grinsted® sodium steaoryl lactylate (SSL) P55 anionic surfactant, and Dimodan® HS K-A (10% monopalmitin, 90% monostearin), Sodium hydroxide (2N NaOH) was obtained from Fischer (St. Louis, Mo.), vegetable oils (corn, canola, sunflower, soybean, peanut) were purchased in a local supermarket, and deionized water was of milliq grade.

A 10% (w/w) stock of MAG in vegetable oil—all oils performed equally well—was prepared by melting 10 g of the solid MAG (m.p. ~73° C.) and 500 mg of the SSL powder in 89.5 g of oil at 85° C. for 30 minutes and cooled to 75° C. Appropriate volume fractions of 75° C. alkaline deionized water (5 drops of 2N NaOH in 100 mL), in the range 20% to 70% (v/v), were then added to the MAG-oil stock in a glass bowl heated to 75° C. The material was mixed with the aid of an electric hand mixer until a macroscopically homogeneous white paste was obtained, and then allowed to set undisturbed at room temperature (22° C.). The material set almost immediately. For 100 mL batches, setting was complete within 30 minutes. The mixture preferably contains at least 4% (w/w) distilled monoglyceride for proper gel formation and stability.

Example 2

Dynamic Shear Rheology

Dynamic Theological measurements were carried out with a TA Instruments AR2000 rheometer (TA Instruments, New Castle, Del., USA) at 20° C. Approximately 3 g of monoglyceride gels were gently spread on the temperature-controlled (Peltier element) rheometer base. A 60 mm flat acrylic plate was lowered onto this film until a gap size of 1 mm was attained. This was immediately followed by strain sweeps from to 0.003 to 0.80% shear strain at a frequency of 1 Hz. The increase in strain was logarithmic with a sampling frequency of 10 points per decade. Four samples were analyzed for each mixture and the average and standard deviation reported. At least three separate sets of experiments were conducted.

Example 3

Polarized Light Microscopy

Images were acquired using a Leica DM RXA2 upright microscope (Leica Microsystems AG, Bannockburn,; Ill., USA) equipped with epi-polarized reflection illumination and a Retiga 1300 monochrome camera (QImaging, Burnaby, B.C., Canada). Three samples of each mixture were gently spread under a coverslip within the first 10 minutes of setting and examined using a 40× objective in polarization or fluorescence modes. For the fluorescence experiments, Nile Red and Rhodamine dyes were dissolved in either the oil (Nile Red) or the water phase (Rhodamine) prior to mixing. The final concentration of the dye was 0.05% (w/w) in the system. The filer L5 filter cube from Leica was used (exc: BF 480/40 nm; dicheroic mirror; em: BF 527/30 nm). All images were acquired and archived as single, 1280×1024 pixel, 8 bit, untagged documents. Magnification bars and labels were added using Adobe Photoshop 5.5. At least three separate sets of experiments were conducted.

Example 4

Powder X-ray Diffraction

Monoglyceride gel material was smeared between two pieces of Kapton™ tape forming the walls of a custom sample holder. This holder was then placed in an x-ray diffractometer comprised of a Huber four circle goniometer and Nonius sealed tube x-ray source with copper target. All measurements were taken using a scintillation point detector at room temperature. The Lithium fluoride monochromator was set to select the Cu K-alpha1 line (wavelength=1.54 Angstroms). The angular resolution of the spectrometer was 0.1 deg. At least three separate sets of experiments were conducted.

What is claimed is:

1. A process for the preparation of a foodstuff, said process comprising the sequential steps of:
    a. preparing a stock solution of at least one surfactant in oil, said stock solution comprising a non-ionic surfactant and an ionic surfactant in an oil;
    b. heating the stock solution to above the melting point of the surfactant;
    c. combining the stock solution with water to form an oil/surfactant/water composition comprising about 30-70% water;
    d. mixing the composition; and
    e. allowing the composition to set.

2. A process according to claim 1, wherein the stock solution comprises about 3 to 30% (w/w) of surfactant.

3. A process according to claim 2, wherein the stock solution comprises about 5 to 15% (w/w) of surfactant.

4. Process according to claim 1, wherein the melting point is about 50 to 90° C.

5. A process according to claim 1, wherein the water is alkaline, deionized or distilled water.

6. A process according to claim 1 wherein the composition comprises about 40 to 60% water.

7. A process according to claim 1 wherein the composition is mixed while cooling.

8. A process according to claim 1 wherein the composition is cooled to form a solid composition.

9. Process according to claim 1, wherein the oil is a vegetable oil, a fish oil or an animal oil.

10. Process according to claim 9, wherein the oil is a vegetable oil.

11. Process according to claim 10, wherein the vegetable oil is selected from the group consisting of corn oil, canola oil, sunflower oil, safflower oil, soybean oil, peanut oil, olive oil, flaxseed oil, and rice bran oil.

* * * * *